Oct. 18, 1938.   E. W. KELLOGG   2,133,820
NONSLIP FILM PRINTER
Filed Sept. 30, 1937   2 Sheets-Sheet 2
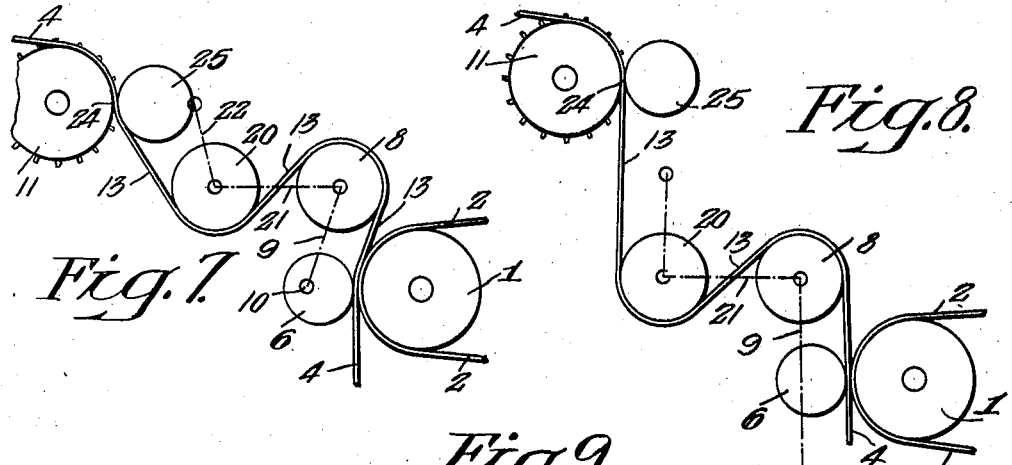
Fig. 7.   Fig. 8.
Fig. 9.
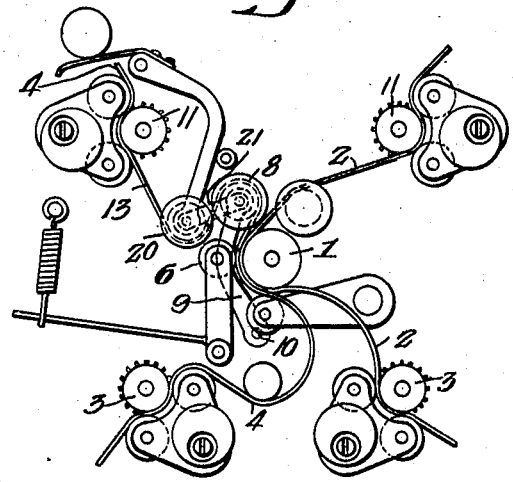
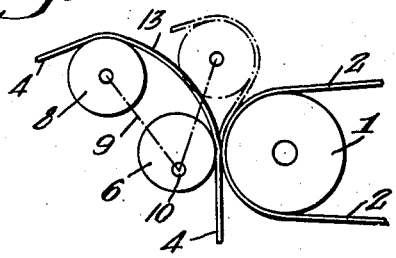
Fig. 11.
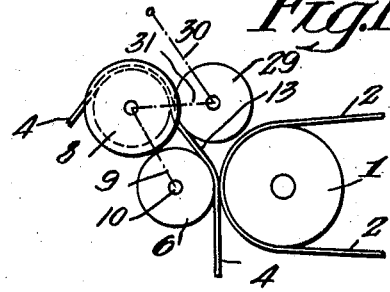
Fig. 12.
Inventor
Edward W. Kellogg
By
Attorney Patented Oct. 18, 1938

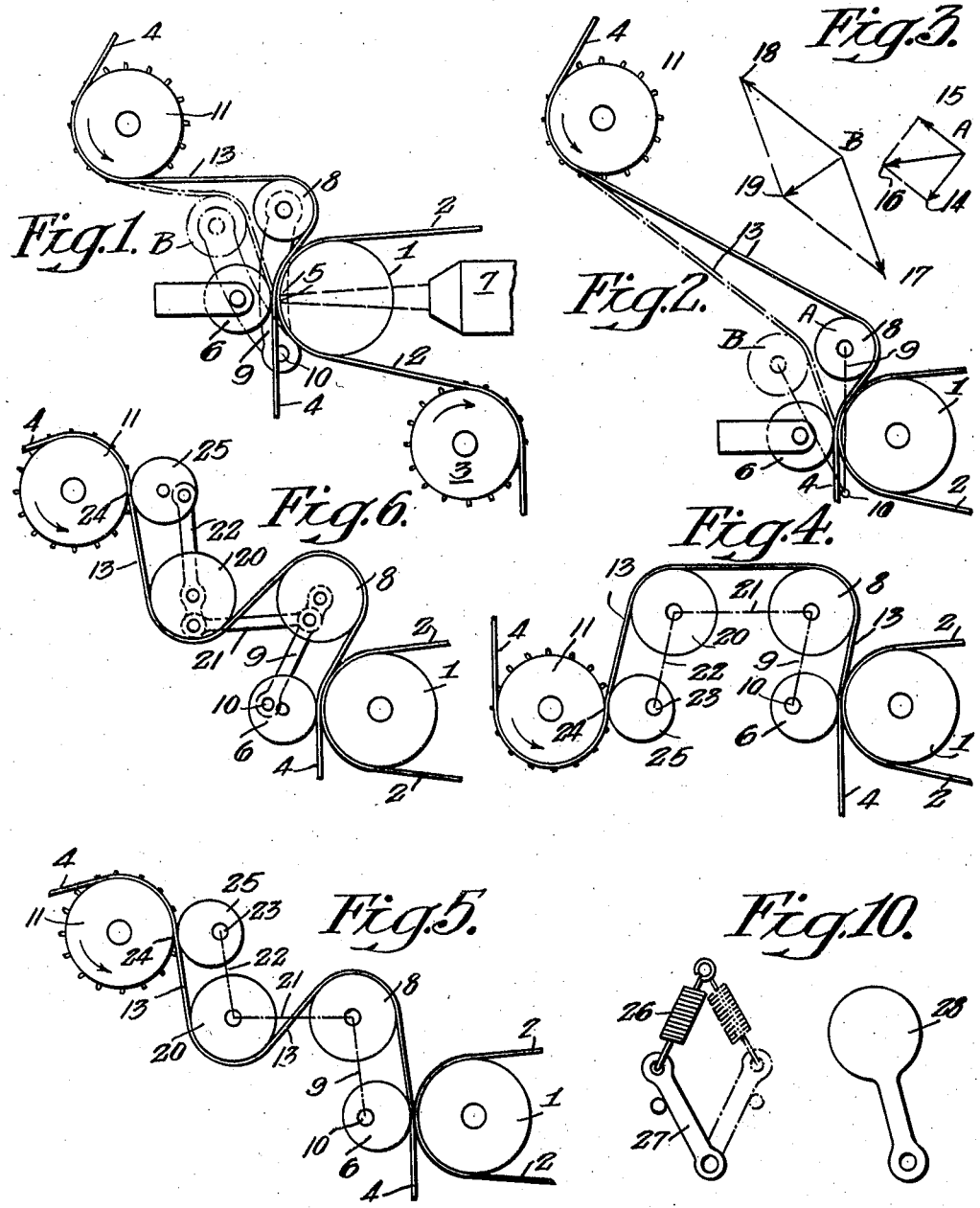

2,133,820

UNITED STATES PATENT OFFICE 2,133,820

NONSLIP FILM PRINTER

Edward W. Kellogg, Moorestown, N. J., assignor to Radio Corporation of America, a corporation of Delaware Application September 30, 1937, Serial No. 166,697

5 Claims. (Cl. 271—2.3)

This invention relates to film-feeding mechanism and especially for feeding negative film and positive film stock in intimate contact through a contact printer without slippage between the films and with compensation for differences in the lengths of the films due to shrinkage or expansion. A film-feeding device of the general type here involved was disclosed and claimed in Bedford Patent 1,754,187, and a printer based on this principle was described in the Journal of the Society of Motion Picture Engineers for August 1934, in an article by C. N. Batsel, and the present invention pertains to an improvement upon the previous devices.

In the apparatus previously described as just referred to, the film travels either in a free loop or in a loop passing around a movable idler to the printing point, and the length of this loop (of positive film stock) varies in accordance with the difference in length of the positive and negative films. The loop length is not directly controlled in any manner and the loop occasionally has a tendency to become unwieldy or to become too tight, either of which affects, to a certain extent, the position of the sound track print upon the film. It is apparent to those skilled in the art that printers of the type here referred to are used almost exclusively in the printing of sound track from the negative to the positive film or in making duplicate negatives and that they are practically never used in making picture prints.

It will be apparent from an inspection of the patent or article above referred to that the principle of the Bedford printer depends upon the changing of the angle of incidence of the positive film stock upon the supporting drum at the printing point, to produce a variation in the effective length of this film stock at the printing point in a manner which will be hereinafter described in greater detail, and to thereby secure compensation for the variation in film length which may be due, for example, to shrinkage. In the present invention I have provided an apparatus which varies this angle of incidence in a very sensitive manner and in which the variation in loop length required to produce a given change in the angle of incidence is a minimum, thereby retaining the relative position of the sound track on the negative and print as nearly similar as possible.

One object of my invention is to provide an improved modification of the printer of the said Bedford patent.

Another object of my invention is to provide a nonslip printer in which a maximum amount of compensation for variations in film length will be secured with a minimum variation in film loop dimensions.

Another object of my invention is to provide a printer of the type described wherein the angle of incidence of the film will be varied a maximum amount for a minimum variation in size of the film loop.

Other and incidental objects of my invention will be apparent to those skilled in the art from a reading of the following specification and from an inspection of the accompanying drawings, in which Figure 1 is an elevation of a commercial form of nonslip printer built in accordance with the aforesaid Bedford Patent 1,754,187, Figure 2 shows the simplest embodiment of my invention wherein a single roller is used to increase the angle of incidence of the film with a given variation in loop length, Figure 3 is a diagram of the forced relations in the arrangement of Figure 2 for two positions of the roller 8, Figure 4 is an elevation of a modified form of printer wherein the film tension remains substantially constant irrespective of the variations in loop length and angle of incidence, Figure 5 shows a modification of the roller arrangement of Figure 4, Figure 6 shows a further modification of Figure 5 wherein the linkage between the rollers is slightly modified so that the roller 20 moves somewhat less than the roller 8, Figure 7 shows a form of the invention wherein the shortening of the loop is effected by displacing the sprocket 11 slightly to the left.

Figure 8 shows a modification of the apparatus shown in Fig. 7 in which the relative length of one of the arms is increased to modify the result produced, Figure 9 shows in greater detail a further modification of the apparatus of Figure 8 involving a further slight change in the linkage which has proven quite satisfactory, Figure 10 shows a type of toggle spring and an equivalent counterweight which may be used in establishing a biasing force in the several types of linkages shown in the other figures, Figure 11 shows the loss of control of angle at low film tensions in the type of apparatus shown in Fig. 2, and Figure 12 shows a modification of the apparatus of Fig. 2 wherein an auxiliary roller is provided to compensate for the elasticity of the film.

Referring now to the drawings,

Figure 1 shows an arrangement of rollers which has been employed in several successful models. The film passes around a drum 1 which is provided with a damped flywheel in order that it may run at uniform speed. Rotation is imparted to the drum by means of the negative film 2 which is propelled by sprocket 3. The unexposed positive film or "raw stock" 4 is maintained in contact with the negative film at the printing point 5 by means of a pressure roller 6 which is held in contact by a spring or springs, not shown. An optical system 7 projects light upon the films at the point 5 where they are in contact. The "raw stock" may be guided by means of a shoe or slide as illustrated in the above-mentioned, Bedford patent, but is preferably passed around a guide roller 8 which is provided with flanges and mounted on a swinging arm 9 which is pivoted at 10 so that it may move back and forth in accordance with the length of the loop of film 13 between the feeding sprocket 11 and the printing point 5.

The sprockets 3 and 11 (which are shown as having the same number of teeth) run at the same speed. This is a requirement for printing a synchronous film. In view, however, of the variations in shrinkage of the films, their linear speed may not be exactly the same even though the number of sprocket holes passed per unit of time is the same. This difference in linear speed is taken care of without slippage by changes in the angle at which the "raw stock" approaches the printing point 5. If the negative is considerably shrunken, the linear speed of the negative is below average and therefore its surface speed at point 5 where the two films are held in contact is low. Under these conditions, sprocket 11 tends to feed the "raw stock" through more rapidly than it is carried past the printing point; therefore, excess film accumulates in the loop 13 between sprocket 11 and printing point 5. A light spring pressure (not shown) causes the guide roller 8 to move over to the right, under these conditions, to take up the excess film. The result is that the "raw stock" now presents a concave surface to the negative. As is well known, the material on the concave surface of a bent strip is under compression, and therefore this part of the "raw stock" is shortened. An equilibrium position is thus reached at which the shortening of the "raw stock" surface due to compression is just sufficient to cause it to move at the correct speed without slipping. If, on the other hand, the negative has little shrinkage, the drum runs faster and the loop of "raw stock" film tends to become shorter, the guide roller 8 then moves to the left as illustrated at position B. Under these conditions, the "raw stock" presents a convex surface at the point of contact with the negative and thus the surface becomes stretched until equilibrium is again reached. The mean linear speed of the "raw stock" is the average of that of its stretched and compressed surfaces. Pressure roller 6 may run at any speed and the speed of the "raw stock" surface on this side is not a factor in the rate of film travel. Thus, when the guide roller is in position A, the net or center line speed of the "raw stock" is greater than that of the concave or propelled surface, while if the guide roller is in position B, the net speed is less than that of the propelled surface.

The foregoing discussion of the action of the printer is a restatement of what is described in the aforementioned paper by C. N. Batsel. It is evident that the operator cannot count on predicting the size of the loop 13 of "raw stock" between the feeding sprocket 11 and the printing point 5. Since in ordinary practice, a picture is to be printed on the same film, it is evident that both picture and sound must be printed before the film is developed and therefore no photographically printed marks on the "raw stock" can be utilized for registering the film for accurate synchronism. The operator must thread his "raw stock" into the picture printer with a punched or penciled mark corresponding to a given starting mark on the picture negative. He must then thread the same "raw stock" into the sound printer with a certain relation between the position of the same mark on the "raw stock" and a certain starting mark on the sound negative. Since the sprockets 3 and 11 control the feeding of both films, the operator must perform his threading operations with reference to these sprockets. The actual point on the "raw stock" which receives the exposure from a given point on the negative depends upon the relative positions at the printing point 5 which in turn varies with the length of the film loop 13. There will thus be departures from exact synchronism, the amounts of such departures being proportional to the difference in the length of "raw stock" loop as the operator threads up the printer and as it actually runs. It is obviously desirable to reduce these variations in synchronism to the smallest practicable amount. This is especially important if a printer of this type is to be used for 16 mm. film, since in this case a given change in loop length corresponds to a greater time difference and synchronism error than would be the case with 35 mm. prints.

It is therefore a purpose of my invention to provide an arrangement by which the necessary changes in the angle at which the "raw stock" approaches the printing point of a nonslip printer are produced by a minimum change in loop length.

Figure 2 shows a roller arrangement which has been employed in some model printers, and which slightly reduces the variations in loop length. The feeding sprocket 11 in Figure 2 has been raised with reference to its position in Fig. 1 so that the film bends only slightly in passing around guide roller 8. An objection to this arrangement is that as the guide roller moves toward the position B at the left, an excessive degree of film tension is required to hold the roller in this position. If the roller is to be maintained in contact with the film it must be urged to the right by means of a spring or counterweight (not shown). Figure 3 shows the force relations for positions A and B of roller 8. Arrow 14 represents the tension on the film between roller 8 and printing point 5 for position A. Arrow 15 is the vector of the tension between sprocket 11 and guide roller 8. The resultant 16 is seen to be comparable in magnitude with the tension vectors 14 and 15. The conditions for position B are shown by vectors 17, 18 and 19. If a spring is applied to the arm 9, the tangential force represented by vector 19 must be somewhat greater than is required of the vector 16 owing to the increased tension on the spring, and owing to the obtuse angle between vector 17 and 18, they must be excessively large in order to produce an adequate force 19. If too much film tension is required, slipping is likely to occur at the printing point 5, and the benefits of the nonslip printer are lost. It is desirable that the position of the guide roller 8 be controlled by small and nearly constant film tension. In this respect, the arrangement shown in Figure 1 is superior to that shown in Figure 2. In Fig. 1, the film between the sprocket 11 and guide roller 8 pulls in a direction nearly perpendicular to the arm 9. Even here, however, the film tension is not constant, because of the change in the direction of pull of the film below the guide roller.

The conditions to be met in providing a roller arrangement requiring substantially constant film tension may be understood by reference to Fig. 4. In Fig. 4 an extra movable roller is shown, supported on an arm 22 which is pivoted at a point 23. The arms 9 and 22 are connected by a link 21 maintaining rollers 8 and 20 a constant distance apart. Pivot points 10 and 23 are located in line with the printing point 5 and a corresponding point 24 where the film is held between the sprocket 11 and the sprocket pad roller 25. The rollers are supported by this linkage in such a manner that each stretch of unsupported film is substantially parallel to one of the links in the supporting system. Thus tension between roller 8 and printing point 5 is resisted entirely by a compressional stress in arm 9. Tension between rollers 20 and 8 is resisted entirely by compression in link 21 and tension between point 24 and roller 29 is resisted by compression in arm 22. There is thus complete equilibrium, and tension on the film has no tendency to cause a displacement of the linkage in any direction. Neither does the total loop length between points 24 and 25 change at all by shifting the position of the rollers. This of course is an impossible condition for operation, since a shortening of the loop would only result in increased tension and would fail to move the rollers as desired. If, however, a slight change is made from Fig. 4, the required conditions can be readily obtained. For example, if the point at which the link 21 is pivoted to arm 9 is lowered (making the link 21 no longer exactly parallel to the film between rollers 20 and 8) so that roller 20 executes slightly less motion than roller 8, then as the rollers move to the left they will approach each other or the tangent between them will become slightly shorter. Under these conditions, a shortening of the film loop will cause the rollers to move to the left as desired. Another expedient consists in retaining the linkage as shown in Fig. 4 but moving the sprocket slightly to the left. This causes the film tangent between point 24 and roller 20 to shorten as the rollers move to the left. The film must perform mechanical work in displacing the rollers to the left against spring action and it can only perform this mechanical work if it is under some tension and the loop becomes shorter. The force which the film under a given tension can exert on the roller to produce displacement may be measured by the amount of loop shortening per unit change in roller position. The smaller the change in loop length, the greater must be the film tension to overcome a given biasing spring tension urging the rollers to the right. The best design is therefore a compromise between the desirability of small change in loop length and small film tension. The most desirable conditions are attained if the biasing spring or counterweight is as light as will be consistent with maintaining the desired loop form and properly guiding the film. The second important factor is to so design the linkage that the ratio of roller movement to loop shortening is substantially constant throughout the required range of movement. This insures that there will not be a tight spot. The constant of proportionality between roller movement and loop shortening is then adjusted so that at no position will the tension be enough to cause danger of slipping, while at the same time the amount of loop shortening is reduced as far as is consistent with the permissible tension.

It may not be convenient to locate the feeding sprocket and pad roller as indicated in Fig. 4.

Fig. 5 shows an arrangement providing more nearly the relative positions employed in present printers but still employing the same principles as illustrated in Fig. 4. The arrangement shown in Fig. 5 is similar to that in Fig. 4 in that the stretch of free film between the guide roller 8 and the printing point 5 is substantially parallel and equal in length to the supporting arm 9. Likewise, the stretch of film between the sprocket 11 and extra roller 20 is substantially parallel to arm 22. The film between rollers 20 and 8 is not parallel to link 21 but is nevertheless of constant length. As previously pointed out in the discussion of Fig. 4, the linkage as shown in Fig. 5, wherein the stretches of free film are parallel to the supporting arms, provides no change in loop length as the rollers are shifted, and therefore tension on the film cannot cause the rollers to move. The proportions of the linkage must then be slightly modified so that movement of the rollers to the left is accomplished by a small but continuous shortening of the loop.

Fig. 6 shows a modification wherein the position of the connecting link 21 is shifted so that roller 20 moves somewhat less than roller 8, and Fig. 7 shows an arrangement wherein the shortening of the loop is effected by displacing the sprocket 11 slightly to the left. It is not essential that the pivot points 10 and 23 be placed on the same levels as the points 5 and 24 at which the film is restrained from movement.

In general, as one of the arms (for example, arm 9) is lengthened, the stretch of free film at the other end of the linkage should be correspondingly lengthened. This results in an arrangement such as shown in Fig. 8. There are, however, various modifications in the proportions of the linkage and positions of the rollers which will give satisfactory results.

Fig. 9 shows the arrangement employed in a model which has been built and operated. In this model proportions were changed and rollers shifted until an arrangement was found in which, throughout the total required range of movement of guide roller 8, there is a substantially constant ratio of movement of guide roller 8 to change in total loop length. In whatever design is used, it is desirable that the guide roller 8 be placed as close as practicable to the pressure roller 10 so that a small movement of the guide roller causes a large change in angle of the film. The essential characteristic of the arrangements is that a second roller is employed, and the two rollers are connected in such a way that the tendency of the movement of the shaft or guide roller 8 to shorten the loop is accompanied by a movement of the second roller 20 which offsets the shortening effect or, in other words, which by itself tends to lengthen the loop. The combination is so designed that there is throughout the movement of the guide roller a continuous change in the total length of the loop.

The employment of the second roller has a further advantage in that an increased wrap around the guide roller 8 is provided for all positions of said guide roller. This is conducive to more satisfactory guiding.

As has already been pointed out, it is desirable that the tension on the film be as low as consistent with satisfactory guiding. Practical design considerations may call for modification of the guide roller linkage which give a nonlinear relation between change in loop length and movement of guide roller. Under these conditions, the film tension may become objectionably high when operating in that part of the range where the change in loop length is relatively small. If the tendency is for the film tension to become too great when the loop is shortest, a spring of the familiar toggle type, as shown in Fig. 10 (wherein a compression spring 26 is pivotally connected to arm 27), may be employed to reduce the restoring or biasing force toward the end of the movement. Such a spring may be designed to provide the entire controlling or biasing force, or may be used in conjunction with another spring or a counterweight. A similar effect is obtained by the employment of a counterweight 28 on one of the swinging arms, the weight being placed above the pivot point. These expedients may be employed to offset any effects which tend to return the guide roller to a mid-position or which tend to increase the biasing force when the rollers are displaced to the left. Such increase in biasing force results from the employment of any biasing spring, but by using a sufficiently long spring, this change in biasing force may be made very small. Bending of the film itself produces an elastic force which tends to cause greater tension as the guide roller approaches the extreme left-hand portion. In other words, the film acts as a stabilizing spring and this effect may also be offset by a properly designed toggle spring or counterweight.

If the film tension is maintained as low as is desirable, there results a slight loss of control of angle. Thus, as shown in Fig. 11, as the guide roller moves toward the left, the film takes a curving path between the guide roller and the printing point, and the bend at the point 5 is less sharp than would be the case were the film under greater tension. An increase in range of angle control may be secured by means of an auxiliary roller 29, as shown in Fig. 12. This roller supported on arm 30 swings in such an arc that, when guide roller 8 is farthest to the right, roller 29 clears the drum 3, and does not come in contact with the film between the guide roller and the printing point, but when the guide roller moves to the left, or to the position illustrated, the auxiliary roller 29 swings to a lower position and puts a reverse curve in the film. This expedient in itself considerably reduces the total change in loop length required to provide a given amount of shrinkage compensation. It also increases the wrap around the guide roller for the position in which this wrap is least. The auxiliary roller 29 must, of course, be so mounted that it can be made to clear the flange of the guide roller for threading. Since it should be very close to guide roller 8 during operation, the provision for threading may call for making the link so that it may be lengthened or disengaged for threading, but restored to normal length for operation. Another expedient consists in omitting the flange from roller 8, and providing in lieu thereof a stationary edge-guide plate mounted on arm 9 or on the spindle of roller 8, in such a position that it does not interfere with threading.

It will be apparent to those skilled in the art that my invention is not limited to sound track printers or to any other type of film printers, but is of general application in any circumstance or apparatus where it is necessary to feed a strip of flexible material over a rotating drum and where the speed at which the material is fed to the drum differs slightly from the peripheral speed of the drum itself. The most usual application of the apparatus, however, at least insofar as it now appears, lies in the feeding of motion picture film or similar perforated strip where a given number of perforations is fed to the apparatus in a limited time and the strip is then fed past an operation point where a uniform linear speed must be maintained corresponding to the average speed as determined by the perforations.

The invention is of particular utility in any apparatus where a flexible strip is driven which is fed past two points and the speed of operation of the driving systems at those two points is not controlled by the strip but nevertheless the loop of strip between said two points must not be subjected to excessive strain nor permitted to vary beyond certain limits in total length.

I claim as my invention:

1. Driving apparatus for a belt or strip comprising a driving roller therefor, a member arranged to press the belt or strip against the driving roller, a second driving member for the belt or strip arranged to feed the same into a loop from which it passes to the driving roller, and roller means adapted to vary with variations in the size of the loop the angle of incidence of the belt or strip as it reaches the roller.

2. Film driving apparatus comprising a driving roller, a member adapted to press the film thereagainst, a sprocket having a driving connection with the roller and arranged to feed the film around a pair of movable rollers from which it passes to the driving roller, the position of said movable rollers varying the flexure of the film toward or away from the driving roller where the film is caused to engage the driving roller.

3. Driving apparatus for a film comprising a driving roller, a roller arranged to press the film against the driving roller, and a sprocket adapted to engage the film and move it into a loop of variable size from which it passes to said rollers, the curvature of the film as it reaches the point of contact with the two rollers being governed by a pair of connected movable rollers controlled by the size of the loop.

4. Film driving apparatus comprising a driving sprocket and a driving roller each engaging the film and connected to be driven from a common source, and a second roller adapted to press the film against the driving roller, the parts being so located with respect to one another that the film passes from the sprocket to the point of engagement of the two rollers around a pair of connected movable rollers through a variable loop whose size controls the position of the movable rollers and thereby the curvature of the film as it reaches said point.

5. Film driving apparatus comprising a sprocket, a driving roller, an idler for pressing the film against the roller, a common driving connection to said sprocket and roller, the parts being so located with respect to one another that the film passes from the sprocket through a loop to the point of contact therewith of the roller and idler, and a pair of connected movable rollers adapted to assist in flexing the film relative to the driving roller when it reaches the point of engagement with the driving roller and idler.

EDWARD W. KELLOGG.